US012619186B2

(12) United States Patent
Miyajima

(10) Patent No.: US 12,619,186 B2
(45) Date of Patent: May 5, 2026

(54) IMAGE FORMING SYSTEM HAVING SHEET PROCESSOR WITH THERMAL BINDING, CONTROL METHOD AND STORAGE MEDIUM

(71) Applicant: CANON KABUSHIKI KAISHA, Tokyo (JP)

(72) Inventor: Jun Miyajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 18/634,175

(22) Filed: Apr. 12, 2024

(65) Prior Publication Data

US 2024/0345527 A1 Oct. 17, 2024

(30) Foreign Application Priority Data

Apr. 17, 2023 (JP) ................................ 2023-066906

(51) Int. Cl.

*G03G 15/00* (2006.01)
*B65H 37/04* (2006.01)
*B65H 43/04* (2006.01)

(52) U.S. Cl.

CPC ......... *G03G 15/6544* (2013.01); *B65H 37/04* (2013.01); *B65H 43/04* (2013.01); *G03G 15/5016* (2013.01); *G03G 15/6555* (2013.01); *G03G 15/6585* (2013.01); *G03G 15/70* (2013.01); *B65H 2301/51432* (2013.01); *B65H 2551/20* (2013.01); *B65H 2601/11* (2013.01); *G03G 2215/00835* (2013.01)

(58) Field of Classification Search

None

See application file for complete search history.

(56) References Cited

U.S. PATENT DOCUMENTS

2013/0286076 A1* 10/2013 Ogawa ....................... B41J 3/46 347/16
2018/0126767 A1* 5/2018 Kanamoto .............. B42B 5/106
2023/0278819 A1* 9/2023 Koba ....................... B65H 7/06 271/258.01

FOREIGN PATENT DOCUMENTS

JP 2004209859 A 7/2004
JP 2017136769 A 8/2017

* cited by examiner

*Primary Examiner* — Leslie J Evanisko

(74) *Attorney, Agent, or Firm* — Canon U.S.A., Inc. IP Division

(57) ABSTRACT

The present disclosure relates to a sheet processing system allowing a user to easily remove a sheet from a sheet pressure bonding unit when a jam occurs. A control method for the sheet processing system includes conveying a sheet, pressurizing, for a predetermined time, a plurality of conveyed sheets by a pressurizing unit, detecting an occurrence of a jam of the conveyed sheet or sheets, and controlling the pressurizing unit to release a pressurized state by the pressurizing unit even if the predetermined time has not elapsed in a case where the occurrence of the jam is detected while the plurality of sheets is being pressurized.

10 Claims, 15 Drawing Sheets

IMAGE FORMING SYSTEM HAVING SHEET PROCESSOR WITH THERMAL BINDING, CONTROL METHOD AND STORAGE MEDIUM

BACKGROUND

Field

The present disclosure relates to a sheet processing system, a control method for the sheet processing system, and a storage medium.

Description of the Related Art

As a sheet processing apparatus that bonds sheets, Japanese Patent Application Laid-Open No. 2004-209859 discusses an apparatus that performs thermal pressure bonding of sheets with toner applied thereon as an adhesive material by heating and pressurizing the sheets.

Further, Japanese Patent Application Laid-Open No. 2017-136769 discusses a method of preventing a breakage of an apparatus while allowing a user to perform an appropriate paper jam clearance operation by notifying the user that a cover is locked, before presenting a procedure to clear a paper jam.

In the sheet processing apparatus of the thermal pressure bonding method, a plurality of sheets is sandwiched between a pressuring member and a reception member to be heated and pressurized.

When a paper jam occurs in a sheet conveyance path, a user has difficulty in removing the plurality of sheets present in a pressurizing unit and is sandwiched between the pressuring member and the reception member. If the user tries to forcibly remove the sheet bundle, the sheets may be wrinkled or ripped.

SUMMARY

According to some embodiments, a sheet processing system can include a conveyance unit configured to convey a sheet, a pressurizing unit configured to pressurize, for a predetermined time, a plurality of sheets conveyed by the conveyance unit, a detection unit configured to detect an occurrence of a jam of the sheet or sheets conveyed by the conveyance unit, and a control unit configured to control the pressurizing unit to release a pressurized state by the pressurizing unit even if the predetermined time has not elapsed after the detection unit detects the occurrence of the jam while the pressurizing unit is pressurizing the plurality of sheets.

Further features of the present disclosure will become apparent from the following description of exemplary embodiments with reference to the attached drawings.

DESCRIPTION OF THE EMBODIMENTS

Hereinbelow, various exemplary embodiments, features, and aspects of the present disclosure will be described with reference to the attached drawings. In the present disclosure, the term "image forming apparatus" is defined to include various apparatuses that form (records) images on recording materials (recording media), such as a single function printer, a copying machine, a multifunction apparatus, and a commercial printing machine. Further, the image forming apparatus may be a system (image forming system) including an image forming apparatus main body configured to form an image on a recording material and an apparatus, such as a sheet processing apparatus and a sheet feeding apparatus, that are connected together.

Figure 1:
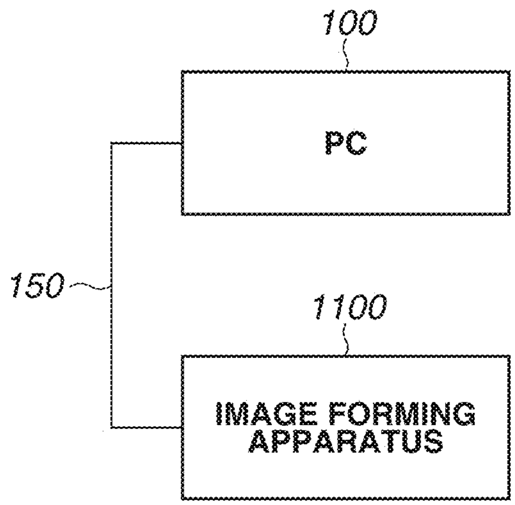
FIG. 1 is a block diagram illustrating a system configuration including a personal computer (PC) and an image forming apparatus.

FIG. 1 is a block diagram illustrating a printing system according to a first exemplary embodiment. The printing system includes a personal computer (PC) 100 and an image forming apparatus 1100 connected with each other via a communication line 150, such as a local area network (LAN) and a universal serial bus (USB).

The PC 100 may be a mobile terminal (e.g., electronic device such as a personal digital assistant (PDA) and, a mobile phone).

Figure 2A:
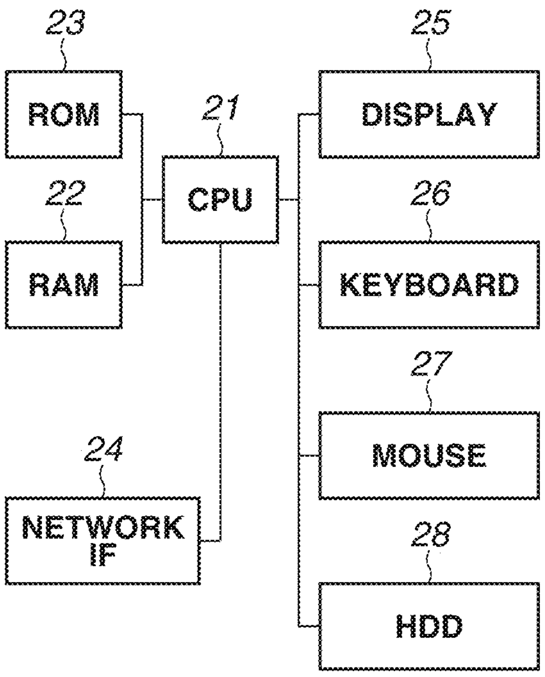
FIGS. 2A and 2B are block diagrams respectively illustrating the PC and the image forming apparatus.

FIG. 2A is a block diagram illustrating a main hardware configuration of the PC 100. The PC 100 includes a central processing unit (CPU) 21, a random access memory (RAM) 22, a read only memory (ROM) 23, a network interface (IF) 24, a display 25, a keyboard 26, a mouse 27, and a hard disk drive (HDD) 28, connected with each other via the CPU 21.

The CPU 21 controls the entire PC 100 using programs and data stored in the RAM 22 or the ROM 23, and performs various kinds of processing described below.

The RAM 22 includes an area for temporarily recording a program or data loaded from the HDD 28. Further, the RAM 22 also includes an area for temporarily recording a program or data received from an external apparatus via the network IF 24, and a work area used when the CPU 21 executes various kinds of processing.

The ROM 23 stores a boot program and setting data with regard to hardware devices constituting the PC 100.

The network IF 24 functions as an interface unit for connecting the PC 100 to the communication line 150, and the PC 100 can perform data communication with an external apparatus via the network IF 24 and the communication line 150. The network IF 24 can be of any type.

The display 25 can display a processing result of the CPU 21 (e.g., print setting screen described below) using images or characters, by connecting to a cathode-ray tube (CRT) display or, a liquid crystal display.

The keyboard 26 and the mouse 27 are typical examples of an input device that functions as a user interface through which various kinds of instructions are input to the CPU 21. However, the types of input devices are not limited thereto.

The HDD 28 stores an operating system (OS), a document creation program, a printer driver, and table data described below. Any other storage device, such as a solid state drive (SSD), can be used as long as the storage device can store data.

The PC 100 reads the installed OS or the program and loads them into the RAM 22, and transmits print information to the image forming apparatus 1100 via the printer driver and the communication line 150 in a case where a document is to be printed after the document is created.

Figure 2B:
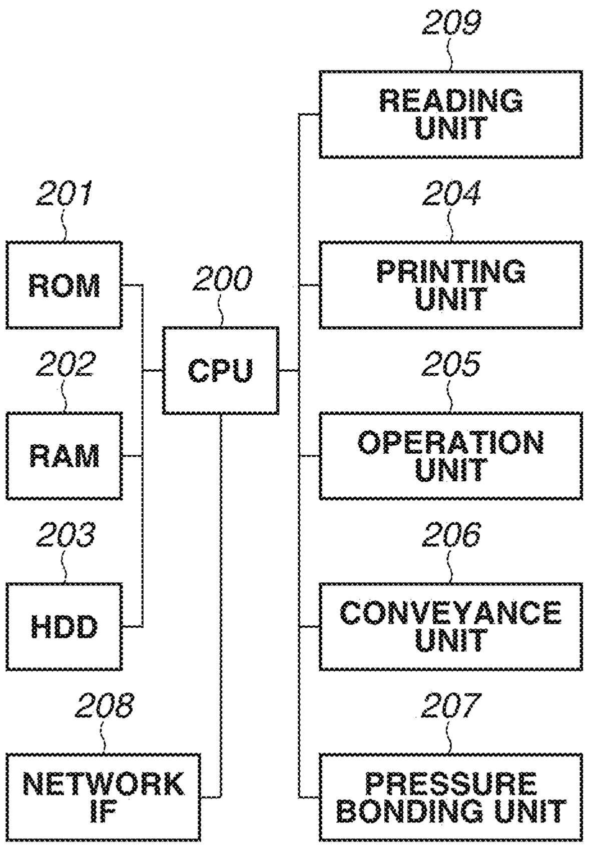

FIG. 2B is a block diagram illustrating a control configuration of the image forming apparatus 1100. The image forming apparatus 1100 includes a CPU 200 serving as a central processing unit. The CPU 200 is connected to a ROM 201, a RAM 202, and an HDD 203 via a bus. The CPU 200 executes various programs stored in the ROM 201 to perform an image forming operation. Further, various kinds of control data used by the CPU 200 at the time of the image forming operation are stored in the RAM 202. The image forming apparatus 1100 also includes the HDD 203 to hold print data. A reading unit 209 reads an image of a document and generates image data. When the CPU 200 receives an image forming operation start request via an operation unit 205 or a network IF 208, the CPU 200 controls each component of a conveyance unit 206 to perform a sheet conveyance operation, and controls each component of a printing unit 204 to perform a printing operation. Further, the CPU 200 executes copying in which the printing unit 204 is caused to perform printing based on the image data generated by the reading unit 209.

Further, depending on a setting, the CPU 200 controls each component of a pressure bonding unit 207 to perform a sheet pressure bonding operation.

Figure 3A:
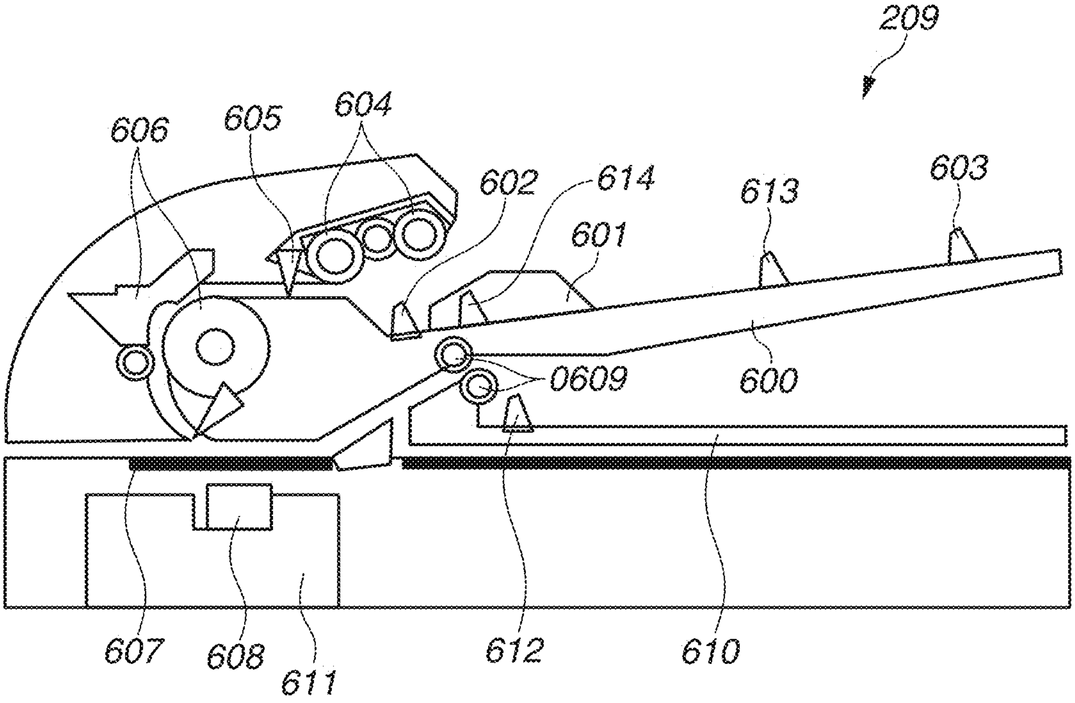
FIGS. 3A and 3B are cross-section diagrams illustrating the image forming apparatus.

FIG. 3A is a diagram illustrating an automatic document feeding device of the reading unit 209 of the image forming apparatus 1100. The automatic document feeding device is also referred to as an automatic document conveyance device or an auto document feeder (ADF).

FIG. 3A is a cross-section side view illustrating an internal configuration of the automatic document feeding device of the reading unit 209. The automatic document feeding device includes a document tray 600 on which documents to be read (originals) are placed. The document tray 600 includes thereon two document guides 601, a document sensor 602 for detecting the presence/absence of a document to be read, and three document size detection sensors 603, 613, and 614.

The document guides 601 can be moved in a direction perpendicular to a document conveyance direction, and a user can stabilize the document conveyance by the user moving the document guides 601 up to positions where the document guides 601 contact both ends of the document in a main scanning direction of the document placed on the document tray 600. The two document guides 601 are arranged side by side in a document lengthwise direction (perpendicular to the document conveyance direction), and the document placed on the document tray 600 is conveyed by three types of rollers, namely, pickup rollers 604, conveyance rollers 606, and sheet discharge rollers 609. The pickup rollers 604 are rollers that conveys the document placed on the document tray 600 to a document conveyance path inside the automatic document feeding device. The conveyance rollers 606 convey the document conveyed to the document conveyance path by the pickup rollers 604, and the sheet discharge rollers 609 convey the document conveyed by the conveyance rollers 606 to a sheet discharge tray 610. The sheet discharge tray 610 is provided with a sheet discharge tray document sensor 612 for detecting the presence/absence of the document conveyed to the sheet discharge tray 610. Further, the document conveyed by the pickup rollers 604 is detected by a document passage detection sensor 605 that determines whether a first document has passed therethrough based on a detected time. In addition, each of the conveyance rollers 606, the pickup rollers 604, and the sheet discharge rollers 609 is driven by a stepping motor (not illustrated). The document conveyed by the automatic document feeding device is read by a contact image sensor (CIS) 608 included in a sensor unit 611, which is disposed under a reading window 607 of the automatic document feeding device, through the reading window 607. The sensor unit 611 can move freely in a sub scanning direction and can also move in a same direction as a conveyance direction of the document conveyed from the conveyance rollers 606 toward the sheet discharge rollers 609. The reading window 607 of the automatic document feeding device has a certain length in the sub scanning direction, and the CIS 608 can be moved to any position within the certain length to read the document at the position after a move. The CIS 608 is composed of a photoelectric conversion element, such as a charge-coupled device (CCD) sensor. The CIS 608 generates control signals to control a first-in first-out (FIFO) memory and the photoelectric conversion element at the same time.

In general, the CIS 608 is configured of a plurality of photoelectric conversion elements arranged in a row.

Figure 3B:
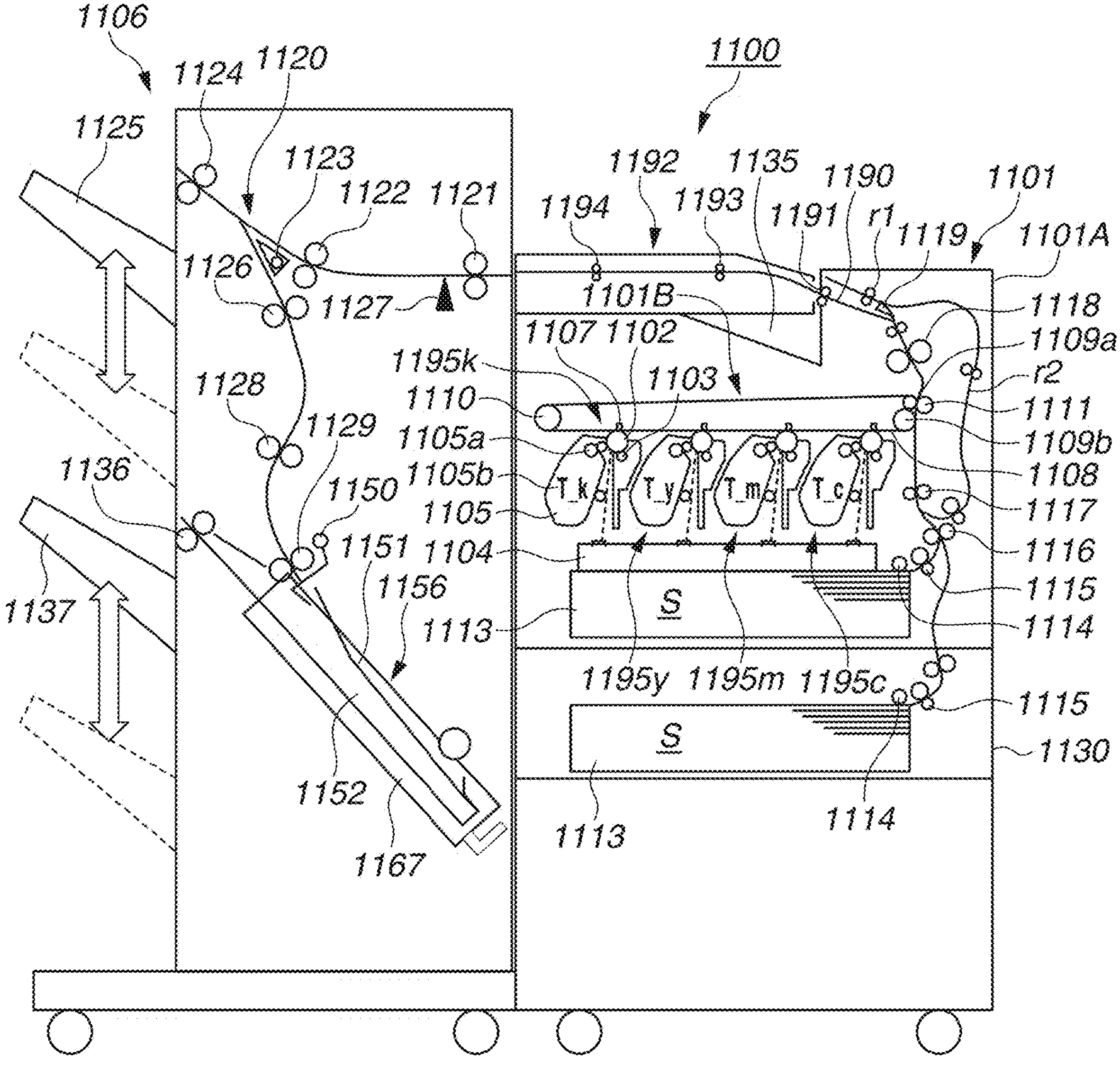

FIG. 3B is a schematic diagram illustrating the printing unit 204 of the image forming apparatus 1100 according to the first exemplary embodiment.

The image forming apparatus 1100 includes a printer main body 1101 serving as an image forming apparatus main body having an image forming function (printing function), and a sheet processing apparatus 1106 having a sheet bonding function. In other words, it can be said that the image forming apparatus 1100 is an image forming system configured of the printer main body 1101, which can function as an image forming apparatus by itself, and the sheet processing apparatus 1106.

The image forming apparatus 1100 according to the present exemplary embodiment can produce a booklet obtained by performing printing and bookbinding on one apparatus, by forming images on a plurality of sheets S one by one by the printer main body 1101 and performing thermal pressure bonding on the plurality of sheets S by the sheet processing apparatus 1106. As the sheets S, various kinds of sheet materials in different sizes and of different materials can be used, and examples of the sheets S include paper, such as plain paper and thick paper, a sheet material with a surface treatment performed thereon, such as coated paper, a plastic film, a cloth, or a sheet material having a special shape, such as an envelope and index paper.

<Image Forming Apparatus Main Body>

The printer main body 1101 is an electrophotographic apparatus including a housing 1101A, and an electrophotographic type image forming unit 1101B accommodated inside the housing 1101A.

The image forming unit 1101B includes an intermediate transfer belt 1108 serving as an intermediate transfer member, process cartridges 1195*y*, 1195*m*, 1195*c*, and 1195*k* arranged along the intermediate transfer belt 1108, a scanner unit 1104 serving as an exposure unit, and primary transfer rollers 1107. The process cartridges for four colors, namely the yellow process cartridge 1195*y*, the magenta process cartridge 1195*m*, the cyan process cartridge 1195*c*, and the black process cartridge 1195*k*, are provided.

The process cartridge 1195*k* forms a single color image corresponding to a black component of a color image using black toner Tk. The process cartridge 1195*y* forms a single color image corresponding to a yellow component of the color image using yellow toner Ty. The process cartridge 1195*m* forms a single color image corresponding to a magenta component of the color image using magenta toner Tm. The process cartridge 1195*c* forms a single color image corresponding to a cyan component of the color image using cyan toner Tc.

Each of the process cartridges 1195*y*, 1195*m*, 1195*c*, and 1195*k* includes a photosensitive drum 1102 serving as an image bearing member, a charging device 1103 serving as a charging unit, and a development unit 1105 serving as a developing unit. In FIG. 3B, the configuration of only the process cartridge 1195*k* is illustrated, but each of the process cartridges 1195*y*, 1195*m*, and 1195*c* has a configuration similar to the process cartridge 1195*k*.

The single color image generated by each of the process cartridges 1195*y*, 1195*m*, 1195*c*, and 1195*k* is primarily transferred to the intermediate transfer belt 1108 in an overlapped manner, and then secondarily transferred onto a sheet S at a secondary transfer portion.

The development unit 1105 in each of the process cartridges 1195*y*, 1195*m*, 1195*c*, and 1195*k* includes a developing roller 1105*a* serving as a developing unit, and a toner container 1105*b* containing toner (developing material). The developing roller 1105*a* is rotatably held by the toner container 1105*b*. In FIG. 3B, only the development unit 1105 in the process cartridge 1195*k* is illustrated, but each of the process cartridges 1195*y*, 1195*m*, and 1195*c* has a configuration similar to the process cartridge 1195*k*. Each of the process cartridges 1195*y*, 1195*m*, 1195*c*, and 1195*k* is attachable to and detachable from the housing 1101A. The "housing 1101A" of the printer main body 1101 refers to a portion of the printer main body 1101 excluding the process cartridges 1195. The housing 1101A includes a frame member, such as a metal frame, constituting a frame body of the printer main body 1101, and a member fixed to the frame body, and forms an attachment space in which the process cartridges 1195*y*, 1195*m*, 1195*c*, and 1195*k* are attached.

The printer main body 1101 can use at least one of the plurality of color toners as a toner for bonding the sheets S with each other. For example, the printer main body 1101 can use the black toner Tk as the toner for recording an image on the sheets S and also for bonding the sheets S. In this case, the process cartridge 1195*k* forms the single color image corresponding to the black component of the color image and a bonding toner image 39 (see FIG. 6) to be transferred to a sheet bonding area.

In the housing 1101A, the scanner unit 1104 serving as the exposure unit is arranged under the process cartridges 1195*y*, 1195*m*, 1195*c*, and 1195*k*. A cassette 1113 (also referred to as a sheet tray or a sheet storage) serving as a containing portion for containing the sheets S to be used for image forming is attached to the housing 1101A in a drawable manner, under the scanner unit 1104. Further, one or more optional sheet feeding apparatuses 1130 each including an additional cassette 1113 may be connected at a lower portion of the housing 1101A.

The intermediate transfer belt 1108 is an endless movable (rotatable) belt that is stretched around a drive roller 1109*a*, a stretching roller 1109*b*, and a tension roller 1110, which rotate around axial lines parallel to each other. The intermediate transfer belt 1108 is moved (rotated or conveyed) counterclockwise in FIG. 3B due to the rotation of the drive roller 1109*a*. On an inner periphery side of the intermediate transfer belt 1108, a primary transfer roller 1107 serving as a primary transfer member is arranged at a position opposing the photosensitive drum 1102 in each of the process cartridges 1195*y*, 1195*m*, 1195*c*, and 1195*k* across the intermediate transfer belt 1108. On an outer periphery side of the intermediate transfer belt 1108, a secondary transfer roller 1111 serving as a transfer member (secondary transfer member) is arranged at a position opposing the drive roller 1109*a* across the intermediate transfer belt 1108. The secondary transfer portion serving as a transfer portion is formed as a nip portion between the intermediate transfer belt 1108 and the secondary transfer roller 1111 therebetween. The intermediate transfer belt 1108, the primary transfer roller 1107 in each of the process cartridges 1195*y*, 1195*m*, 1195*c*, and 1195*k*, and the secondary transfer roller 1111 constitute a transfer unit (transfer portion) for transferring a toner image formed on the photosensitive drum 1102 serving as an image bearing member in each of the process cartridges 1195*y*, 1195*m*, 1195*c*, and 1195*k* onto the sheet S.

In an upper portion of the secondary transfer portion in the housing 1101A, a fixing device 1118 serving as a fixing unit is arranged. The fixing device 1118 has a heat fixing method configuration that fixes a toner image by heating. The fixing device 1118 includes a rotary member pair (e.g., pair of rollers that area fixing roller and a pressure roller) configured to convey the sheet S by nipping the sheet S, and a heat source (e.g., halogen lamp or induction heating mechanism) configured to heat the toner image on the sheet S via the fixing roller.

<Image Forming Operation>

When the printer main body 1101 performs an image forming operation, the sheets S are fed by a feed roller 1114 serving as a feed unit from the cassette 1113 located at the lower portion of the housing 1101A, or the cassette 1113 in the sheet feeding apparatus 1130. A separation roller pair 1115 separates and conveys the fed sheets S one by one. Each sheet S is conveyed by a drawing roller 1116 toward a registration roller pair 1117, and skew feeding of the sheet S is corrected by the leading edge of the sheet S coming in contact with a nip portion of the registration roller pair 1117 in a stopped state. The registration roller pair 1117 sends the sheet S to the secondary transfer portion at a timing in synchronization with the progress of a toner image forming process by the image forming unit 1101B.

On the other hand, in the image forming unit 1101B, the photosensitive drum 1102 in each of the process cartridges 1195*y*, 1195*m*, 1195*c*, and 1195*k*, and the intermediate transfer belt 1108 rotate. The charging device 1103 uniformly charges the surface of the photosensitive drum 1102. The scanner unit 1104 irradiates the photosensitive drum 1102 with a laser beam to write an electrostatic latent image based on image information representing an image to be recorded on the sheet S. The electrostatic latent image is developed (visualized) by the development unit 1105 in each of the process cartridges 1195*y*, 1195*m*, 1195*c*, and 1195*k* using toner.

At this time, in a case where the sheet processing apparatus 1106 performs the thermal pressure bonding described below, the scanner unit 1104 writes an electrostatic latent image by irradiating the photosensitive drum 1102 with a laser beam based on information indicating the bonding position of the sheet S. The electrostatic latent image is developed by the development unit 1105 using toner to form the toner image for bonding in an area on the photosensitive drum 1102 corresponding to the bonding position on the sheet S.

The single color image formed on the photosensitive drum 1102 in each of the process cartridges 1195*y*, 1195*m*, 1195*c*, and 1195*k* is primarily transferred to the intermediate transfer belt 1108 in an overlapped manner. Then, the single color image is conveyed toward the secondary transfer portion by the rotation of the intermediate transfer belt 1108. Then, in the secondary transfer portion, the toner image is transferred (secondarily transferred) to the sheet S sent from the registration roller pair 1117 by a voltage being applied to the secondary transfer roller 1111. The sheet S that has passed through the secondary transfer portion is sent to the fixing device 1118. The toner is softened by the toner image being heated and pressurized, and then the softened toner is hardened and fixed while the sheet S passes through the nip portion between the fixing roller and the pressure roller. In this way, the image is fixed to the sheet S.

A switching unit 1119 switches a conveyance path of the sheet S that has passed through the fixing device 1118. In a case of one-sided printing, the sheet S is guided by the switching unit 1119 to a discharge path 1190, and discharged from the housing 1101A by a discharge roller pair 1191. In the present exemplary embodiment, the printer main body 1101 is connected with the sheet processing apparatus 1106 via a relay conveyance unit 1192. The sheet S discharged by the discharge roller pair 1191 is delivered to the sheet processing apparatus 1106 via conveyance roller pairs 1193 and 1194 of the relay conveyance unit 1192. Further, in a case where the relay conveyance unit 1192 and the sheet processing apparatus 1106 are not connected, the discharge roller pair 1191 discharges the sheet S as a product on a stacking tray 1135 provided on an upper portion of the housing 1101A.

In a case of two-sided printing, the sheet S with an image formed on a first surface thereof is guided to a reversing roller pair r1 by the switching unit 1119. Then, after being reversely conveyed (switch-back conveyed) by the reversing roller pair r1, the sheet S is conveyed toward the registration roller pair 1117 via a two-sided conveyance path r2. After an image is formed on a second surface of the sheet S, which is an opposite surface of the first surface, by passing through the secondary transfer portion and the fixing device 1118, the sheet S is discharged by the discharge roller pair 1191 from the housing 1101A.

Figure 6:
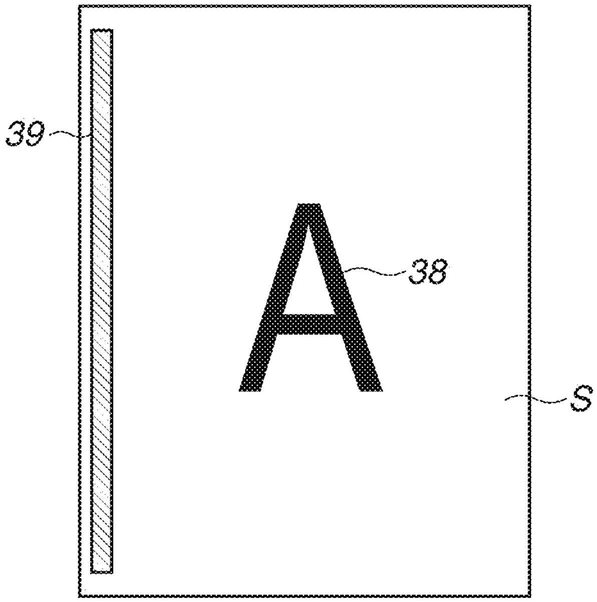
FIG. 6 is a diagram illustrating a toner image to be formed on a sheet by the image forming apparatus.

FIG. 6 is a diagram illustrating an example of a toner image formed on the sheet S. On the sheet S illustrated in FIG. 6, a recording toner image (toner image for recording) 38 for recording an image of a text, a figure, and a picture, and the bonding toner image (toner image for bonding) 39 applied to bond the sheets S with each other, are formed.

The position, shape, width, and the like of the bonding toner image 39 can be changed depending on the configuration of a thermal pressure bonding unit 1167 described below.

In addition, in a case where the image forming apparatus 1100 produces a one-sided printing booklet, the bonding toner image 39 is formed on one surface of each sheet S, i.e., on the same surface as the surface on which the recording toner image 38 is formed. In a case where a two-sided printing booklet is produced, the bonding toner image 39 may be formed on one surface of the sheet S, or on both surfaces of the sheet S.

<Sheet Processing Apparatus>

The sheet processing apparatus 1106 includes a buffer unit 1120 serving as a buffer unit on which a plurality of sheets S is to be stacked, an alignment unit 1156 serving as an alignment unit configured to align the plurality of sheets S, and the thermal pressure bonding unit 1167 configured to perform the thermal pressure bonding of the sheets S. The thermal pressure bonding unit 1167 is an example of a sheet bonding device (bonding unit, bonding means, thermal pressure bonding means, or bonding processing unit) configured to bond the sheets S with each other. Further, the sheet processing apparatus 1106 includes an elevatable discharge upper tray 1125 and an elevatable discharge lower tray 1137 each serving as a discharge destination of the product of the image forming apparatus 1100.

The sheet processing apparatus 1106 is a sheet processing apparatus that receives a plurality of sheets S on each of which an image is formed one by one by the printer main body 1101, performs bonding processing (thermal pressure bonding) thereon, and discharges the sheets S as a sheet bundle (booklet). The buffer unit 1120, the alignment unit 1156, and the thermal pressure bonding unit 1167 will be described in detail below. Further, the sheet processing apparatus 1106 can also discharge the sheets S to the discharge upper tray 1125 or the discharge lower tray 1137 without performing the processing on the sheets S on each of which the image is formed by the printer main body 1101.

<Buffer Unit>

Figure 4:
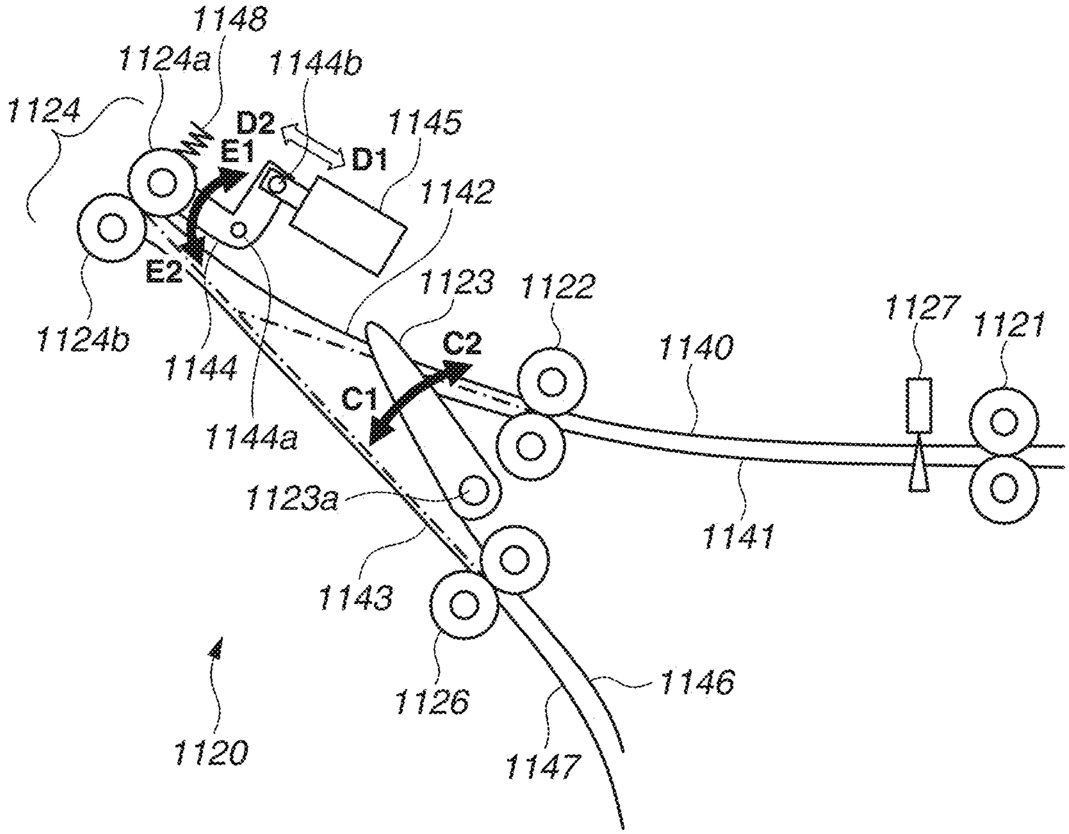
FIG. 4 is a diagram illustrating a buffer unit of a sheet processing apparatus.

With reference to FIGS. 3B and 4, the buffer unit 1120 will be described. FIG. 4 is an enlarged view of a cross-section of the buffer unit 1120. The buffer unit 1120 includes an inlet roller pair 1121, a pre-buffer roller pair 1122, a back-flow prevention valve 1123, a reversing roller pair 1124, and an inner discharge roller pair 1126. Further, the buffer unit 1120 includes an inlet sensor 1127 for detecting the sheet S, and a separation mechanism including a plunger solenoid 1145 and the like to open and close (separate and contact) the reversing roller pair 1124.

The inlet roller pair 1121, the pre-buffer roller pair 1122, the reversing roller pair 1124, and the inner discharge roller pair 1126 each are a roller pair that nips and conveys the sheet S. The inlet roller pair 1121 and the pre-buffer roller pair 1122 are arranged in a conveyance path (inlet path) for the sheet processing apparatus 1106 to receive the sheet S. The reversing roller pair 1124 is arranged in a conveyance path (first discharge path, refer to FIG. 3B) leading to the discharge upper tray 1125. The inner discharge roller pair 1126 is arranged in a conveyance path (inner discharge path, refer to FIG. 3B) leading from the reversing roller pair 1124 to the thermal pressure bonding unit 1167. In addition, the sheet processing apparatus 1106 includes a conveyance path (second discharge path, refer to FIG. 3B) leading from the thermal pressure bonding unit 1167 to the discharge lower tray 1137.

The inlet path is formed of an inlet upper guide 1140 and an inlet lower guide 1141. The first discharge path is formed of a reversing upper guide 1142 and a reversing lower guide 1143. The inner discharge path is formed of an inner discharge upper guide 1146 and an inner discharge lower guide 1147.

The inlet sensor 1127 is arranged so as to detect the sheet S received by the inlet roller pair 1121. For example, a reflection type photo-sensor can be used as the inlet sensor

1127. The reflection type photo-sensor emits infrared light to the inlet path via an opening provided in the inlet upper guide 1140, to determine whether the sheet S is present or absent by detecting reflection light from the sheet S. The inlet lower guide 1141 may be provided with a hole having a diameter larger than a spot diameter of the infrared light emitted by the inlet sensor 1127, so that the infrared light is not reflected when the sheet S is not passing through the inlet path.

The back-flow prevention valve 1123 is arranged downstream of the pre-buffer roller pair 1122 in a sheet conveyance direction in the inlet path. The back-flow prevention valve 1123 is arranged to be rotatable around a rotation shaft 1123*a* with respect to the inner discharge upper guide 1146. The back-flow prevention valve 1123 can move between a first position at which the sheet S is prevented from moving (back-flow) from the first discharge path to the inlet path, and a second position at which the sheet S is allowed to move from the inlet path to the first discharge path. The back-flow prevention valve 1123 is urged by a spring (not illustrated) in a C2 direction from the second position to the first position. The back-flow prevention valve 1123 is configured to move in a C1 direction from the first position to the second position by being pressed by the sheet S, and to return to the first position when the sheet S has passed through.

When viewed in a rotational axis direction of the back-flow prevention valve 1123, a leading end of the back-flow prevention valve 1123 located at the first position overlaps the reversing upper guide 1142. In addition, the leading end of the back-flow prevention valve 1123 is formed in a comb-like shape so as to allow the overlap with the reversing upper guide 1142. Further, when viewed in the rotational axis direction of the back-flow prevention valve 1123, a space through which the sheet S can pass through is formed between the back-flow prevention valve 1123 located at the second position and the reversing upper guide 1142.

The reversing roller pair 1124 is configured of a reversing upper roller 1124*a* and a reversing lower roller 1124*b*, and a drive force is supplied to each of the reversing rollers. The reversing upper roller 1124*a* and the reversing lower roller 1124*b* are configured to rotate constantly in synchronization with each other. Further, a separation lever 1144 is connected to the reversing upper roller 1124*a*. The separation lever 1144 is supported to be rotatable around a lever fulcrum shaft 1144*a* with respect to the reversing upper guide 1142. Further, the separation lever 1144 is connected with the plunger solenoid 1145 to be rotatable around a solenoid connection shaft 1144*b*1.

When a current flows through the plunger solenoid 1145, since a core moves in a D1 direction in FIG. 4, the separation lever 1144 moves in an E1 direction in FIG. 4. In this case, the reversing roller pair 1124 becomes a separation state (state where the nip portion is released) in which the reversing upper roller 1124*a* and the reversing lower roller 1124*b* are separated from each other. Further, when the current flowing through the plunger solenoid 1145 stops, the reversing upper roller 1124*a* moves in an E2 direction due to an urging force of a pressurizing spring 1148, and the core of the plunger solenoid 1145 moves in a D2 direction. In this case, the reversing roller pair 1124 becomes a contact state (state where the nip portion is formed) in which the reversing upper roller 1124*a* and the reversing lower roller 1124*b* are in contact with each other.

As will be described below, the buffer unit 1120 performs an operation of placing a newly conveyed sheet S on a sheet S or a sheet bundle while reciprocally moving the sheet S or the sheet bundle between the reversing roller pair 1124 and the inner discharge roller pair 1126. With this operation, the buffer unit 1120 can send the sheets S in a stacked state of a predetermined number of sheets (e.g., five sheets), to the alignment unit 1156.

As illustrated in FIG. 3B, the sheet bundle stacked in the buffer unit 1120 is conveyed from the inner discharge roller pair 1126 to a kick-out roller pair 1129 via an intermediate conveyance roller pair 1128. Then, the sheet bundle is conveyed by the kick-out roller pair 1129 to the alignment unit 1156 (intermediate stack unit or processing stage) including an intermediate upper guide 1151 and an intermediate lower guide 1152. Further, a bundle hold-down flag 1150 is arranged downstream of the kick-out roller pair 1129 to prevent floating of a trailing end of the stacked sheet, so that the trailing end of the stacked sheet already stacked on the alignment unit 1156 and a leading end of a subsequent sheet conveyed to the alignment unit 1156 do not interfere with each other.

<Operation of Thermal Pressure Bonding Unit>

With reference to FIGS. 5A to 5F, a thermal pressure bonding operation of the thermal pressure bonding unit 1167 will be described. Each of FIGS. 5A to 5F is a diagram of the thermal pressure bonding unit 1167 viewed in the sheet conveyance direction (Y direction).

Figures 5A, 5B, 5C, 5D, 5E, 5F:
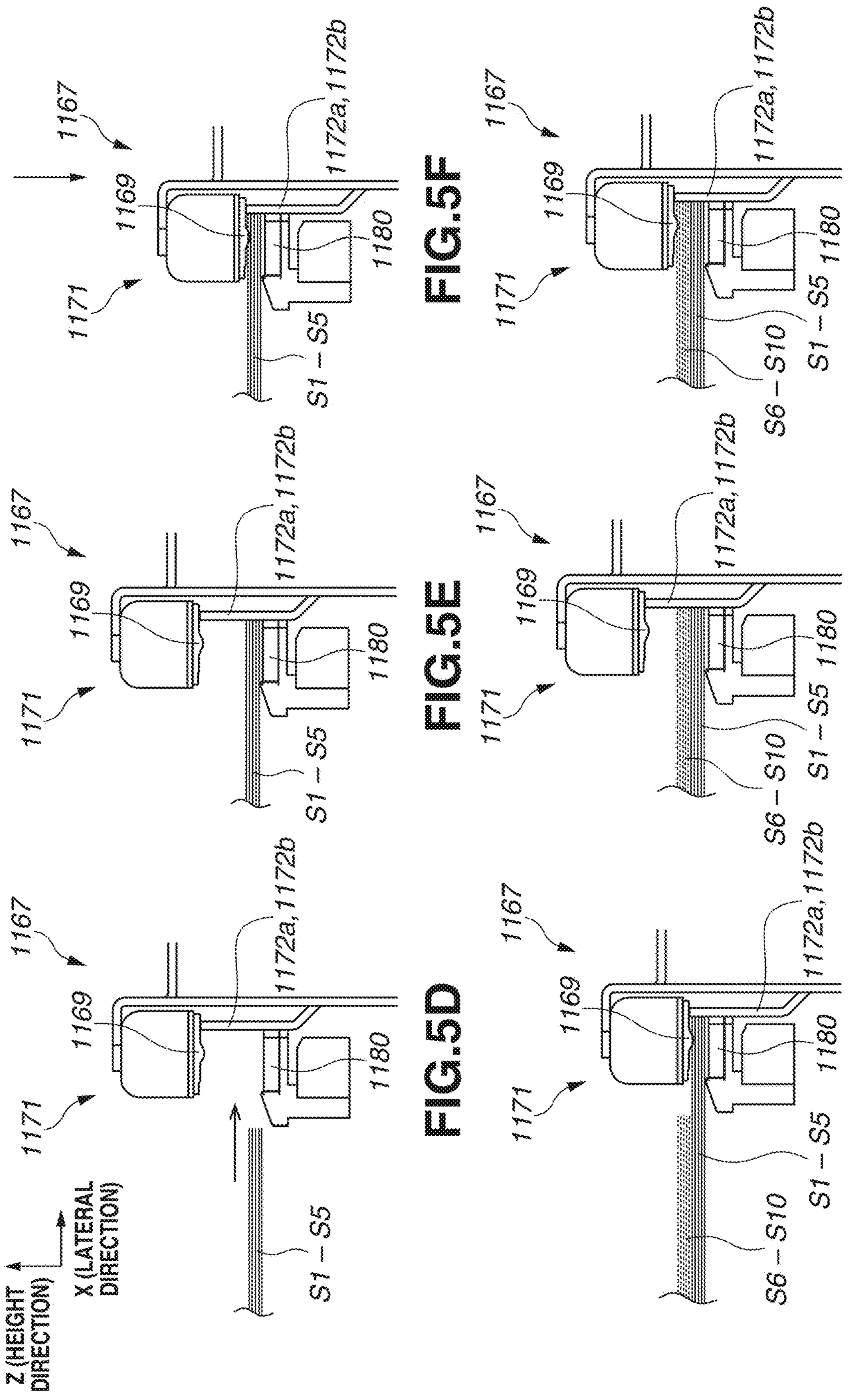
FIGS. 5A, 5B, 5C, 5D, 5E, and 5F are diagrams illustrating a series of operations of a thermal pressure bonding unit.

FIG. 5A illustrates a state where alignment of sheets S1 to S5 in the sheet conveyance direction (Y direction) has been completed. In this state, a heater unit 1171 is located at a position separate from the sheet bundle in a Z direction.

FIG. 5B illustrates a state where the alignment of the sheets S1 to S5 in a width direction thereof has been completed. The sheets S1 to S5 are aligned in a sheet width direction (X direction) by being caused to abut on width alignment reference plates 1172*a* and 1172*b*.

FIG. 5C illustrates a state where the heater unit 1171 moves in a pressurizing direction (−Z direction) by a positive rotation of a motor, and a contact surface of a pressurizing plate 1169 is in contact with the uppermost sheet S5.

FIG. 5D illustrates a state where the sheets S1 to S5 are sandwiched between the pressurizing plate 1169 and a reception plate 1180 and the thermal pressure bonding of the sheets S1 to S5 is being performed as a result of continued driving of the motor. Further, FIG. 5D illustrates a state where next sheets S6 to S10 are conveyed to the alignment unit 1156 in parallel with the thermal pressure bonding of the sheets S1 to S5.

FIG. 5E illustrates a state where, after the thermal pressure bonding of the sheets S1 to S5 is completed, the heater unit 1171 moves (retracts) in an opposite direction (+Z direction) of the pressurizing direction due to a reverse rotation of the motor and the pressurizing plate 1169 is separated from the sheet S5. Further, FIG. 5E illustrates a state where the alignment of the next sheets S6 to S10 is performed, and after the heater unit 1171 is retracted, the sheets S1 to S10 are caused to abut on the width alignment reference plates 1172*a* and 1172*b*.

FIG. 5F illustrates a state where the heater unit 1171 moves in the pressurizing direction (−Z direction) again by the positive rotation of the motor, the sheets S1 to S10 are sandwiched between the pressurizing plate 1169 and the reception plate 1180, and the thermal pressure bonding of the sheets S6 to S10 is being performed. In this state, since the toner image for bonding is formed on the upper surface of the sheet S5 and/or the lower surface of the sheet S6, the sheet bundle including the sheets S1 to S5 and the sheet bundle including the sheets S6 to S10 are subjected to thermal pressure bonding.

As described above, the thermal pressure bonding unit 1167 can produce a booklet including the number of sheets S larger than a predetermined number of sheets S, by performing one thermal pressure bonding operation each time the bundle including the predetermined number of sheets S is aligned by the alignment unit 1156. In the present exemplary embodiment, the description is given of the example of the booklet including ten sheets of the sheets S1 to S10, but it is possible to produce a booklet including several tens of sheets S or more.

When the thermal pressure bonding on all the sheets S constituting a copy of the booklet is completed, the booklet consisting of the sheets S1 to S10 is pushed out by a vertical alignment reference plate, and conveyed in a direction (−Y direction) about the sheet conveyance direction toward a bundle discharge roller pair 1136 (FIG. 3B). In other words, the vertical alignment reference plate is an example of a push out member configured to push out the sheet bundle from the alignment unit 1156 and the thermal pressure bonding unit 1167. In addition, separate from the vertical alignment reference plate serving as a reference for aligning the sheet bundle, a push out member configured to push out the processed sheet bundle may be provided.

The bundle discharge roller pair 1136 is openable/closable (separable/contactable) roller pair, and receives a booklet in a separated state. After the leading end of the booklet in a direction in which the vertical alignment reference plate pushes out the booklet passes beyond a position of the bundle discharge roller pair 1136, the vertical alignment reference plate stops moving, and the bundle discharge roller pair 1136 is switched to the contact state. In this way, the bundle discharge roller pair 1136 nips and conveys the booklet, and discharges the booklet to the discharge lower tray 1137. On the other hand, the vertical alignment reference plate returns to a standby position again after delivering the booklet to the bundle discharge roller pair 1136.

As described above, also with the configuration according to the present exemplary embodiment, it is possible to provide a sheet bonding apparatus capable of bonding sheets more stably, a sheet processing apparatus, and an image forming apparatus.

Now, with reference to FIGS. 7A and 7B, a printer driver will be described.

The printer driver is a print control program installed in the PC 100 and executed by the CPU 21. Further, the printer driver generates print information, when called by a document program also installed in the PC 100, including a print setting command for printing and a drawing data command to be printed. The CPU 21 transmits the print information generated by using the printer driver to the image forming apparatus 1100 connected to the PC 100 via the communication line 150 using the OS, and the print processing and the sheet processing are performed by the image forming apparatus 1100.

Figure 7A:
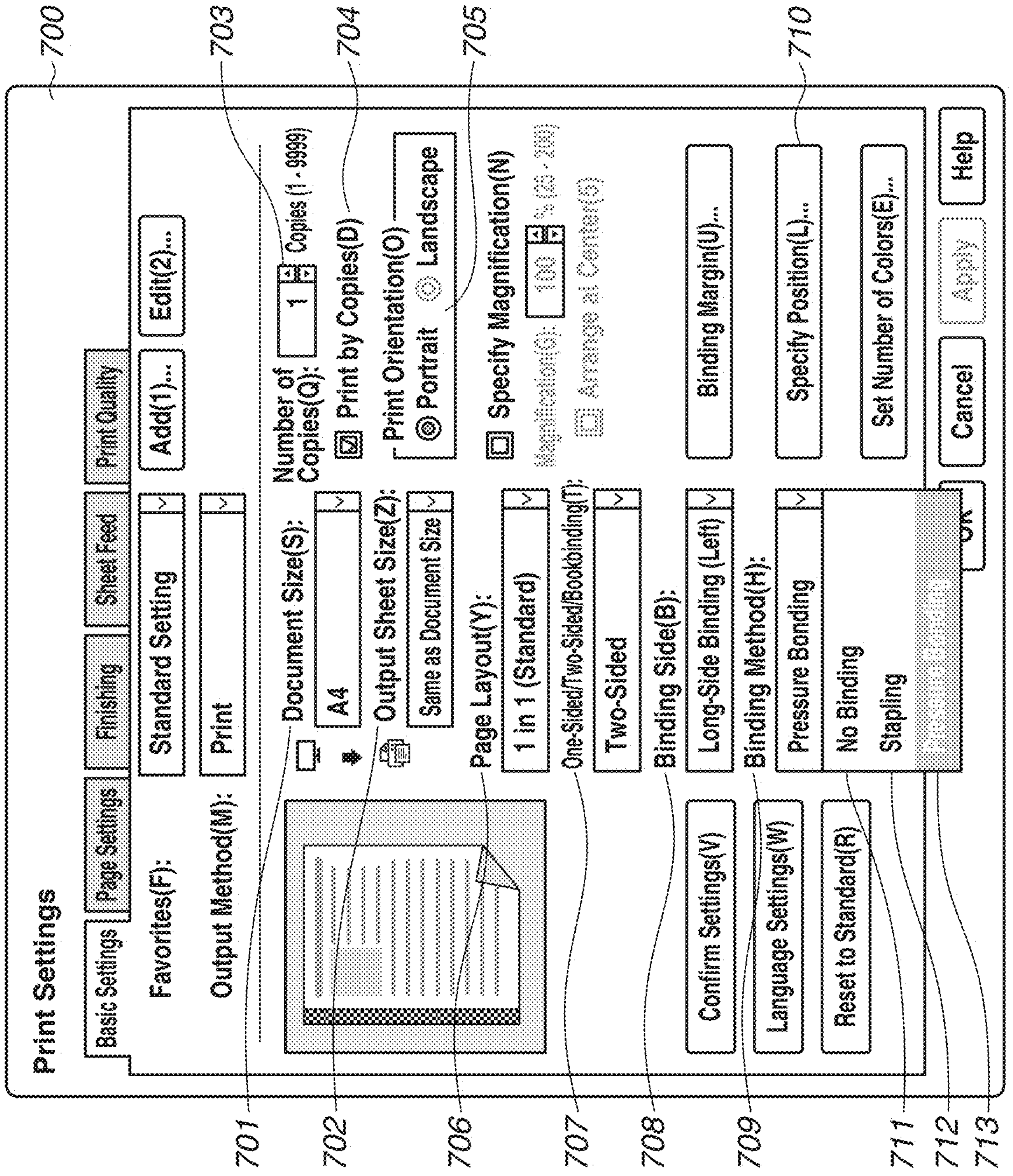
FIGS. 7A and 7B are diagrams illustrating screens of a printer driver.

FIG. 7A is an example of a print setting screen of the printer driver installed in the PC 100. A print setting screen 700 is displayed on a display device, such as the display 25, based on an instruction from the CPU 21, and a user performs print settings via the print setting screen 700 using an input device, such as a mouse and a keyboard.

The print setting screen 700 provides basic print settings, such as a "Document Size" 701, an "Output Sheet Size" 702, a "Number of Copies" 703, a "Print by Copies" 704, and a "Print Orientation" 705. Further, the print setting screen 700 provides extended print functions, such as a "Page Layout" 706 for setting layout printing or the like, a "One-Sided/Two-Sided/Bookbinding" 707 for setting one-sided printing or two-sided printing, and bookbinding, and a "Binding Side" 708 for setting a binding side of a print product. Further, the print setting screen 700 according to the present exemplary embodiment includes a control for a "Binding Method" 709 for setting a binding method of the print product. The print setting screen 700 in FIG. 7A illustrates a screen when the "Binding Method" 709 is set, and a "Pressure Bonding" 713 for setting thermal pressure bonding related to the present exemplary embodiment can be set in addition to a "NO Binding" 711 for performing no binding processing, and a "Stapling" 712 for stapling the product.

Figure 7B:
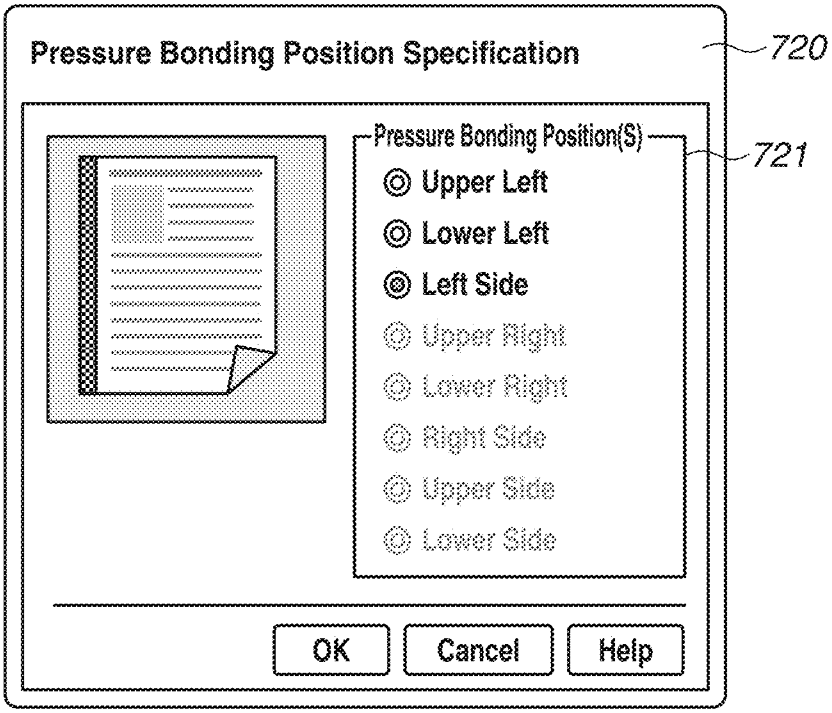

FIG. 7B illustrates a setting screen for specifying a position at which the binding method set by the "Binding Method" 709 is applied. The setting screen is displayed on a display device, such as the display 25, based on an instruction from the CPU 21 when a user presses a "Specify Position" 710 in FIG. 7A. In a case where the "Pressure Bonding" 713 is set for the "Binding Method" 709, a pressure bonding position specification screen 720 as illustrated in FIG. 7B is displayed. A user sets a "Pressure Bonding Position" 721 in the pressure bonding position specification screen 720. Radio buttons for settable pressure bonding positions are displayed in an enabled state, and radio buttons for non-settable pressure bonding positions are displayed in a disabled state. A user specifies a radio button for a desired pressure bonding position from among the enabled radio buttons for the pressure bonding positions. The example in FIG. 7B illustrates a state where three positions of an "Upper Left", a "Lower Left", and a "Left Side" are in the enabled state and are settable, and the "Left Side" is set.

When the "Pressure Bonding" 713 is set for the "Binding Method" 709, the CPU 21 writes a command to perform thermal compression bonding at the position set for the "Pressure Bonding Position" 721 in the print information using the printer driver, and the pressure bonding unit 207 of the image forming apparatus 1100 that has received the print information performs the pressure bonding processing.

Figure 8A:
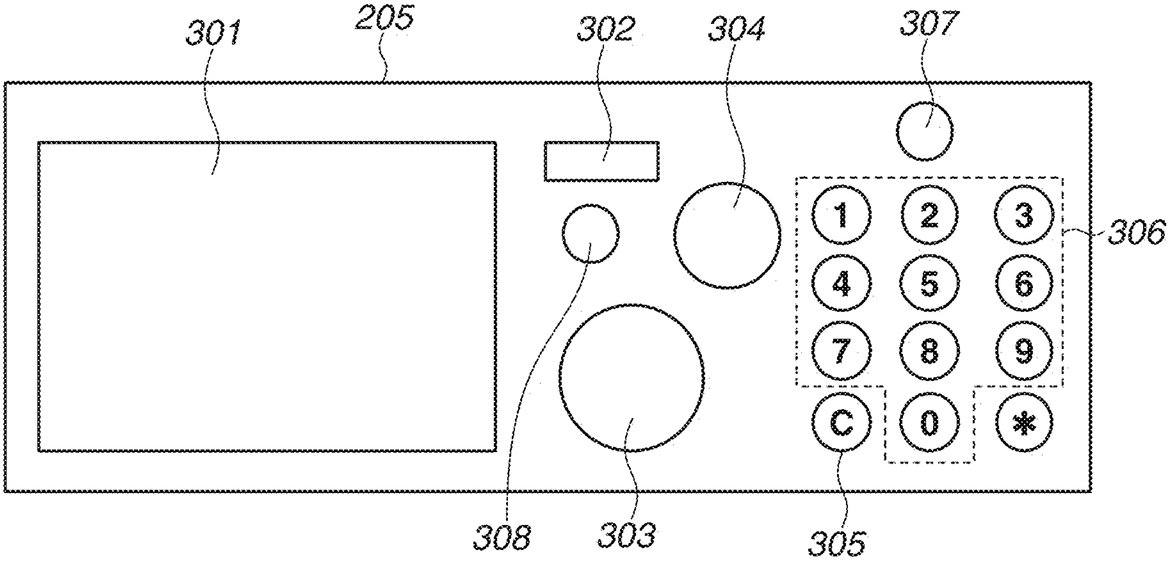
FIGS. 8A, 8B, and 8C are diagrams illustrating an operation unit.
Figure 8B:
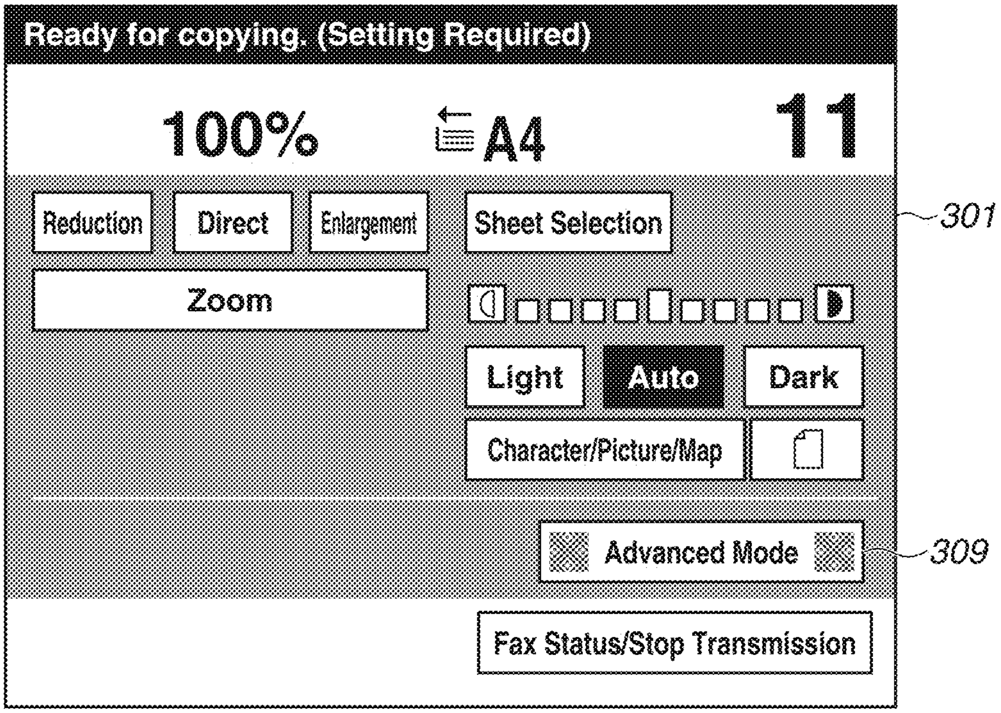

In FIG. 8A, the operation unit 205 is an operation unit of the image forming apparatus 1100. Using the operation unit 205, the user inputs and sets various kinds of conditions and information for the CPU 200 of the image forming apparatus 1100. FIG. 8A is a plan view of the operation unit 205 according to the present exemplary embodiment. A touch panel display 301 normally displays the number of copies, a selected sheet size, a magnification, and a copy density as illustrated in FIG. 8B. When the user presses an "Advanced Mode" 309 in the touch panel display 301, the screen shifts to a screen in which various settings for a copy job can be made. A reset key 302 is used to return a copy mode to a standard mode. A start key 303 is used to start a copy operation. A stop key 304 is used to halt the copy operation. A clear key 305 is used to return the copy mode to the standard mode. A numeric keypad 306 is used to set the number of copies. A user mode key 307, when pressed by the user, enables the user to perform menu selection to register various settings to the image forming apparatus 1100.

Figure 8C:
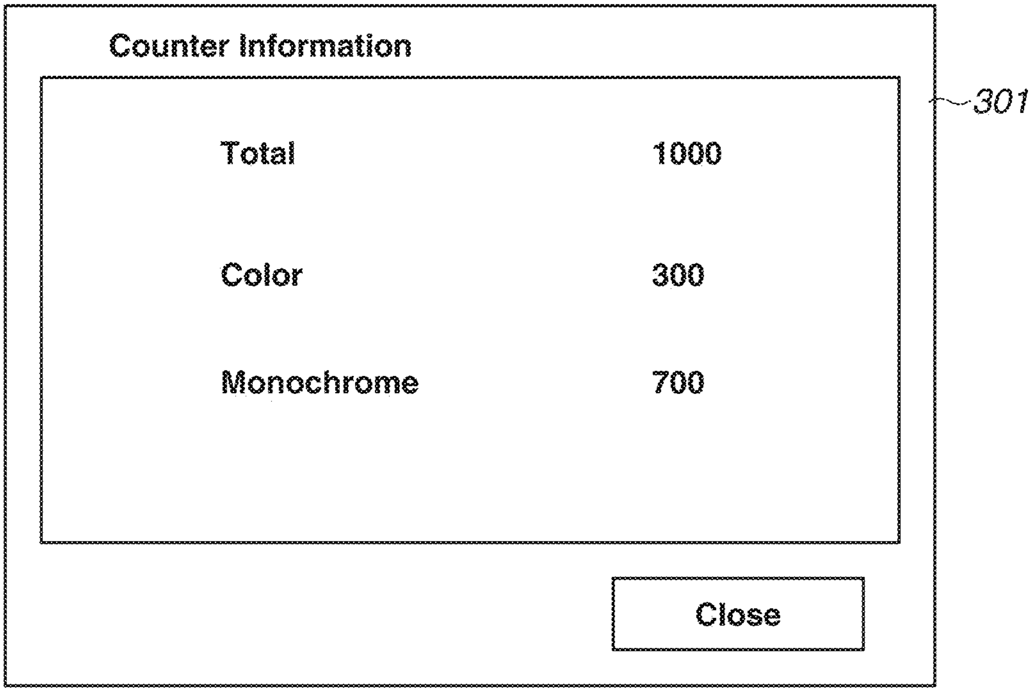

When the user presses a counter key 308, the touch panel display 301 shifts to a screen illustrated in FIG. 8C, and the user can see various pieces of counter information.

Further, the touch panel display 301 is also used to notify the user of information, such as paper jam information and toner information.

Figure 9:
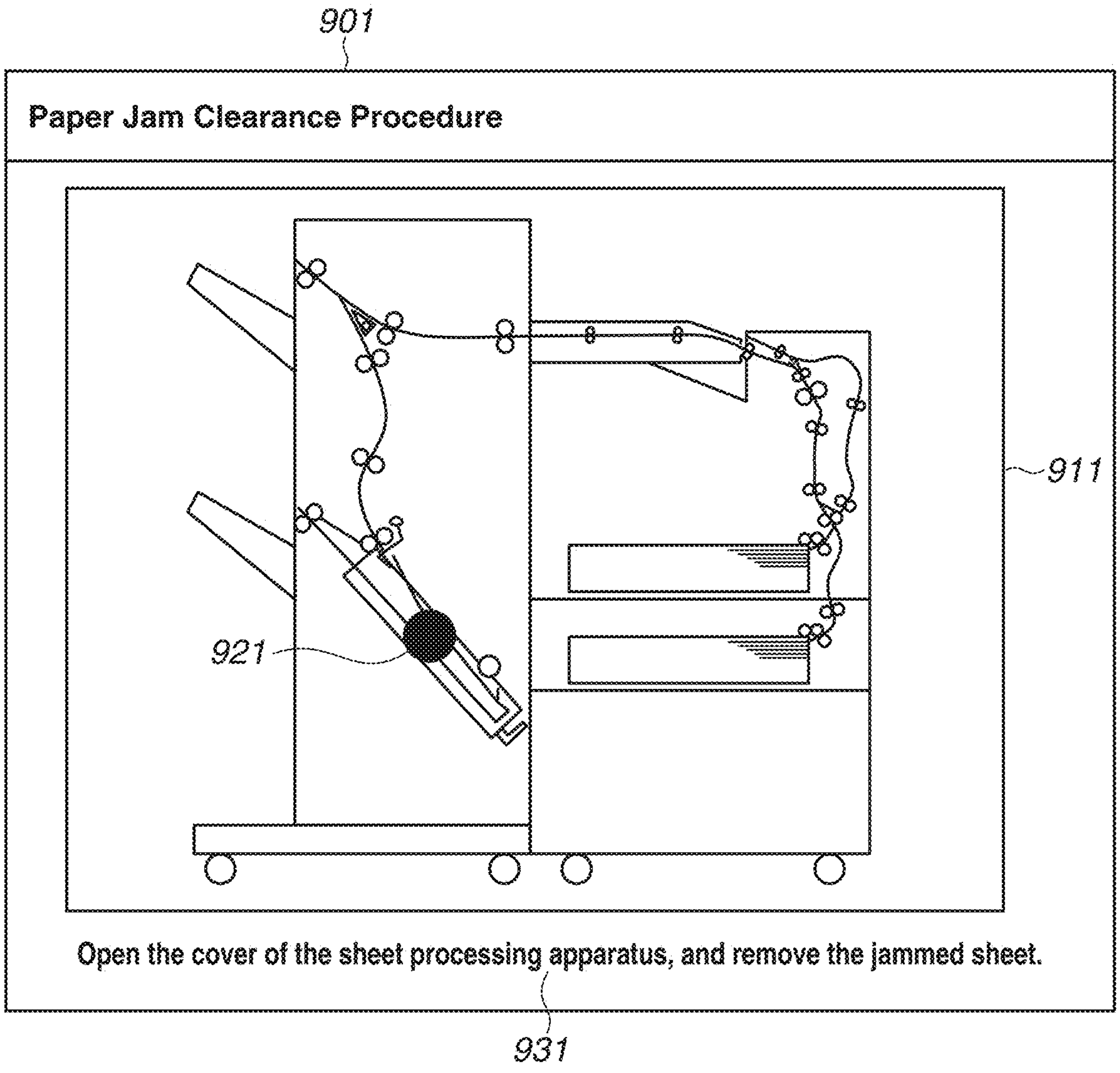
FIG. 9 is a diagram illustrating a paper jam information screen according to a first exemplary embodiment.

With reference to FIG. 9, a paper jam information screen will be described. A paper jam information screen 901 is a screen displayed on the touch panel display 301 when a certain anomaly occurs on a conveyance path during an image forming operation, the sheet S in the middle of the image forming operation is not properly conveyed, and the image-related operation cannot be continued.

The paper jam information screen 901 displays a cross-section diagram 911 of conveyance paths, a filled circle 921 indicating an occurrence position of a paper jam, and a paper jam clearance processing procedure 931 to be performed by the user to clear the paper jam.

The filled circle 921 indicates that the paper jam has occurred in the alignment unit 1156 of the sheet processing apparatus 1106. Further, to prompt the user to clear the paper jam, the paper jam clearance processing procedure 931 notifies the user of a procedure of opening a cover of the sheet processing apparatus 1106 to remove the jammed sheet S.

Figure 10:
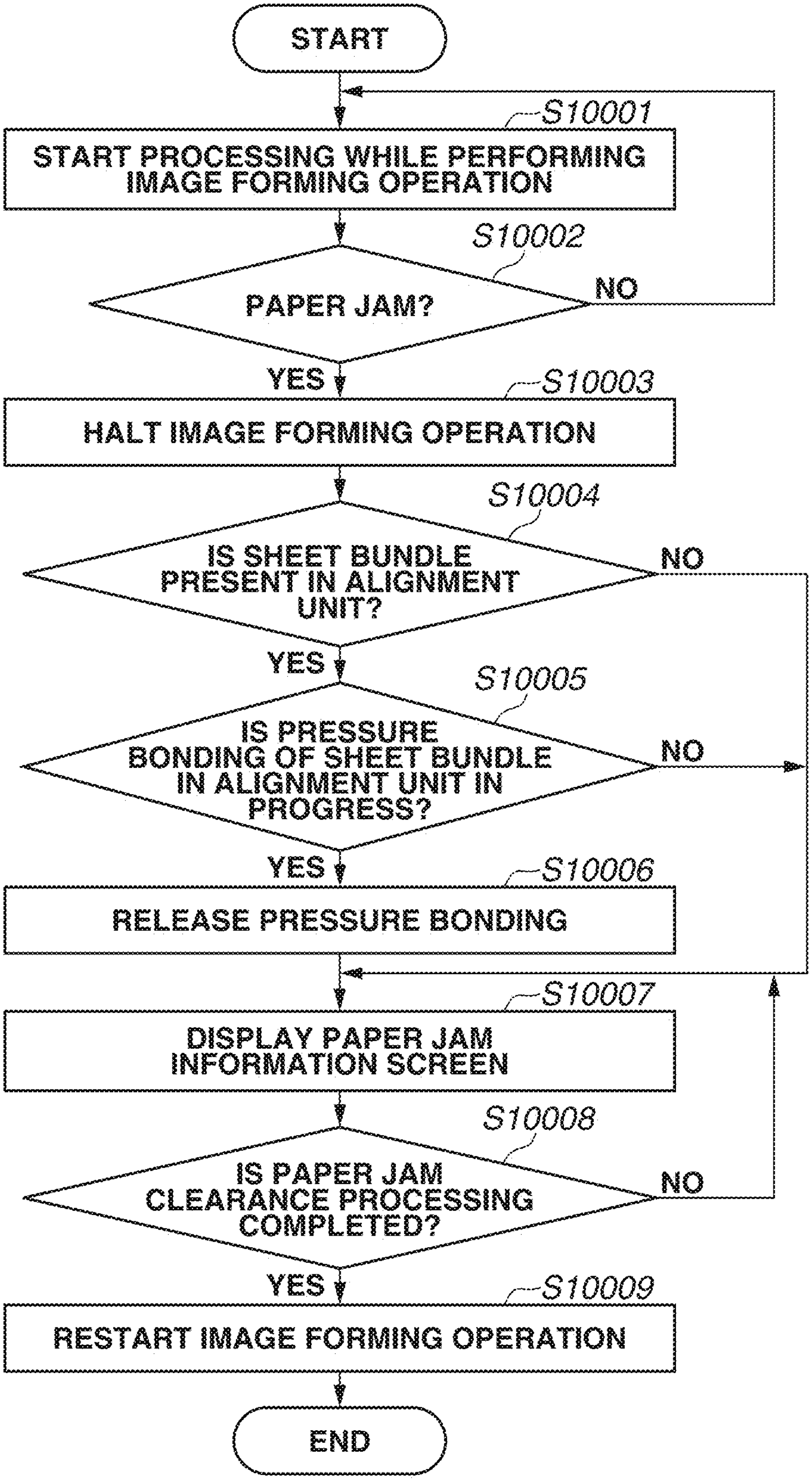
FIG. 10 is a flowchart illustrating processing performed by the image forming apparatus according to the first exemplary embodiment.

FIG. 10 is a flowchart illustrating an operation performed by the CPU 200 of the image forming apparatus 1100 according to the present exemplary embodiment. In FIG. 10, each of steps S10001 to 10009 indicates a step of processing performed by the CPU 200 in the flowchart. The processing performed in steps S10001 to 10009 of the flowchart is implemented by the CPU 200 of the image forming apparatus 1100 reading and executing the program stored in the ROM 201 or the HDD 203.

In step S10001, the CPU 200 of the image forming apparatus 1100 starts the processing in a state of executing the image forming operation described with reference to FIGS. 3A and 3B. The image forming operation is a series of operations of conveying a sheet S from the cassette 1113, forming an image on the sheet S by the image forming unit 1101B, and discharging the image-formed sheet S to the stacking tray 1135, the discharge upper tray 1125, or the discharge lower tray 1137. Further, the image forming operation also includes sheet processing for binding a plurality of sheets S by the sheet processing apparatus 1106.

In step S10002, the CPU 200 of the image forming apparatus 1100 checks whether a certain anomaly has occurred on the conveyance path during the image forming operation, i.e., whether a paper jam has occurred. In a case where the paper jam has occurred (YES in step S10002), the processing proceeds to step S10003. On the other hand, in a case where the paper jam has not occurred (NO in step S10002), the processing returns to step S10001 to continue the image forming operation.

In step S10003, the CPU 200 of the image forming apparatus 1100 halts the image forming operation since the paper jam has occurred in step S10002, and the processing proceeds to step S10004.

In step S10004, the CPU 200 of the image forming apparatus 1100 checks whether a sheet bundle is present in the alignment unit 1156 of the sheet processing apparatus 1106. In a case where the sheet bundle is present (YES in step S10004), the processing proceeds to step S10005. Otherwise (NO in step S10004), the processing proceeds to step S10007.

In step S10005, the CPU 200 in the image forming apparatus 1100 checks whether the thermal pressure bonding unit 1167 is performing pressure bonding of a sheet bundle in the alignment unit 1156 of the sheet processing apparatus 1106. In a case where the pressure bonding is being performed (YES in step S10005), the processing proceeds to step S10006. On the other hand, in a case where the pressure bonding is not being performed (NO in step S10005), the processing proceeds to step S10007.

In step S10006, the CPU 200 of the image forming apparatus 1100 releases a pressure bonding state by the thermal pressure bonding unit 1167. In other words, the operation shifts the thermal pressure bonding operation performed by the thermal pressure bonding unit 1167 in FIGS. 5A to 5F from the state in FIG. 5C to that in FIG. 5B, or from the state in FIG. 5F to that in FIG. 5E. After the pressure bonding state by the thermal pressure bonding unit 1167 is released, the processing proceeds to step S10007.

In step S10007, the CPU 200 of the image forming apparatus 1100 displays the paper jam information screen 901 on the touch panel display 301. Since the pressure bonding state of the sheet bundle by the thermal pressure bonding unit 1167 is released in step S10006, the user can easily remove the sheet bundle from the thermal pressure bonding unit 1167.

In step S10008, the CPU 200 of the image forming apparatus 1100 checks whether the paper jam clearance processing has been completed. In a case where the paper jam clearance processing has been completed (YES in step S10008), the processing proceeds to step S10009. On the other hand, in a case where the paper jam clearance processing has not been completed (NO in step S10008), the processing returns to step S10007. In step S10007, the CPU 200 displays the paper jam information screen 901 (guidance screen indicating a jam clearance procedure) on the operation unit 205. Depending on the progress of the paper jam clearance processing, the CPU 200 of the image forming apparatus 1100 updates the display of the filled circle 921 indicating the paper jam occurrence position, and/or the paper jam clearance processing procedure 931 to be performed by the user to clear the paper jam.

In step S10009, since the paper jam is cleared in step S10008, the CPU 200 of the image forming apparatus 1100 restarts the image forming operation.

As described above, in the present exemplary embodiment, the user can easily remove the sheet bundle from the thermal pressure bonding unit 1167 since the paper jam information screen 901 is displayed after the pressure bonding state of the sheet bundle by the thermal pressure bonding unit 1167 of the alignment unit 1156 is released.

<Flowchart for Printing in Second Exemplary Embodiment>

In the method according to the first exemplary embodiment, since the paper jam information screen 901 is displayed after the thermal pressure bonding unit 1167 releases the pressure bonding state immediately after the occurrence of the paper jam, the user may perform paper jam clearance processing before the bonding of the sheet bundle in the alignment unit 1156 is completed.

In a second exemplary embodiment, a method of preventing the sheet bundle in the alignment unit 1156 from falling apart will be described. Further, a description is given of a method of preventing a delay in presentation of the paper jam clearance processing procedure to a user by not displaying the paper jam information screen 901 after the pressure bonding state is released in a case where a paper jam occurs at a position other than the alignment unit 1156.

Figure 11:
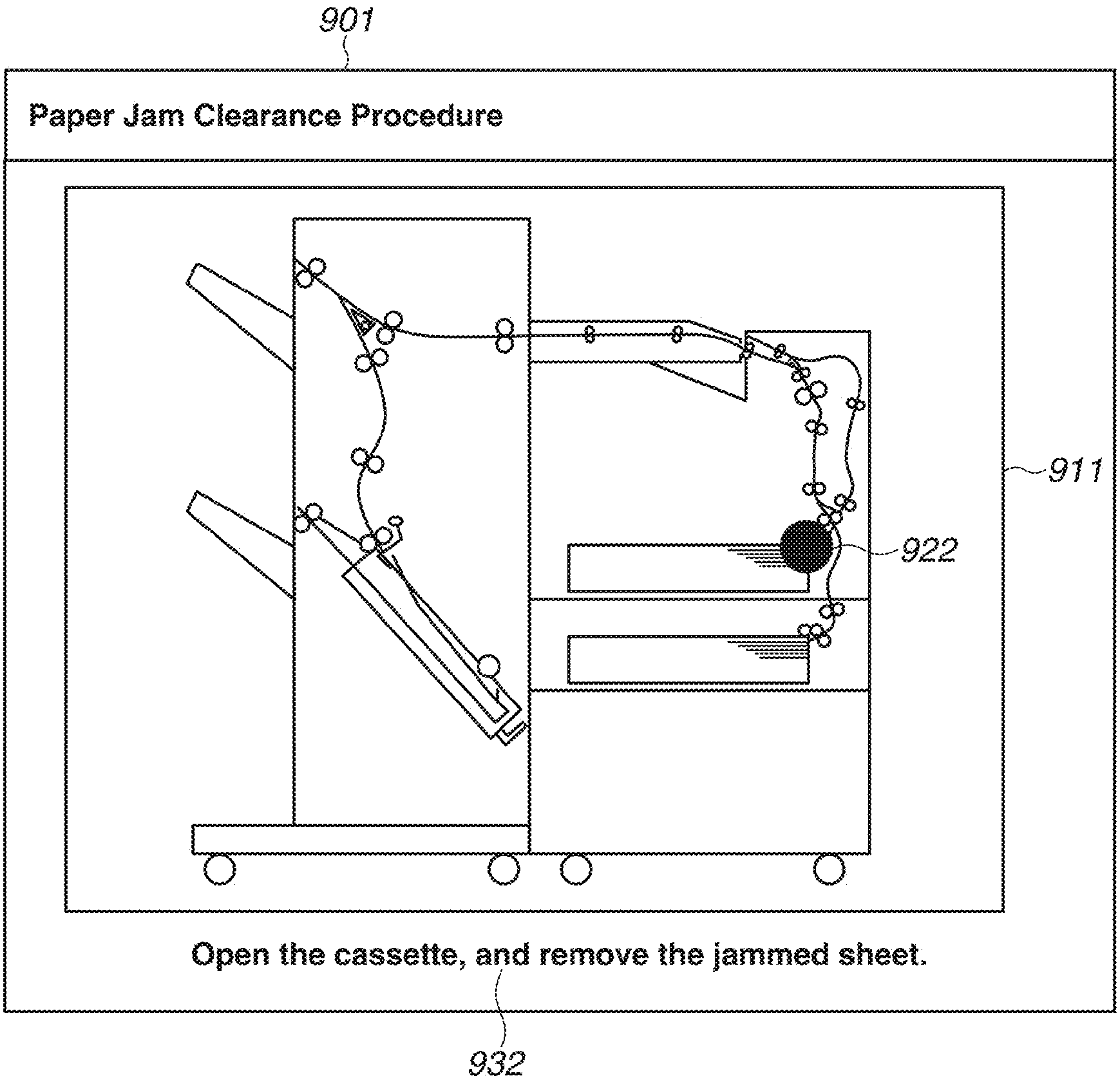
FIG. 11 is a diagram illustrating a paper jam information screen according to a second exemplary embodiment.

With reference to FIG. 11, a paper jam information screen 901 according to the second exemplary embodiment will be described. A paper jam position in the present exemplary embodiment is the cassette 1113 while the paper jam position according to the first exemplary embodiment is the alignment unit 1156 of the sheet processing apparatus 1106.

The paper jam information screen 901 displays the cross-section diagram 911 of conveyance paths, a filled circle 922 indicating an occurrence position of the paper jam, and a paper jam clearance processing procedure 932 to be performed by the user to clear the paper jam.

The filled circle 922 indicates that the paper jam has occurred at the cassette 1113. Further, to prompt the user to clear the paper jam, the paper jam clearance processing procedure 932 notifies the user of a procedure of opening the cassette 1113 to remove a jammed sheet.

Figure 12:
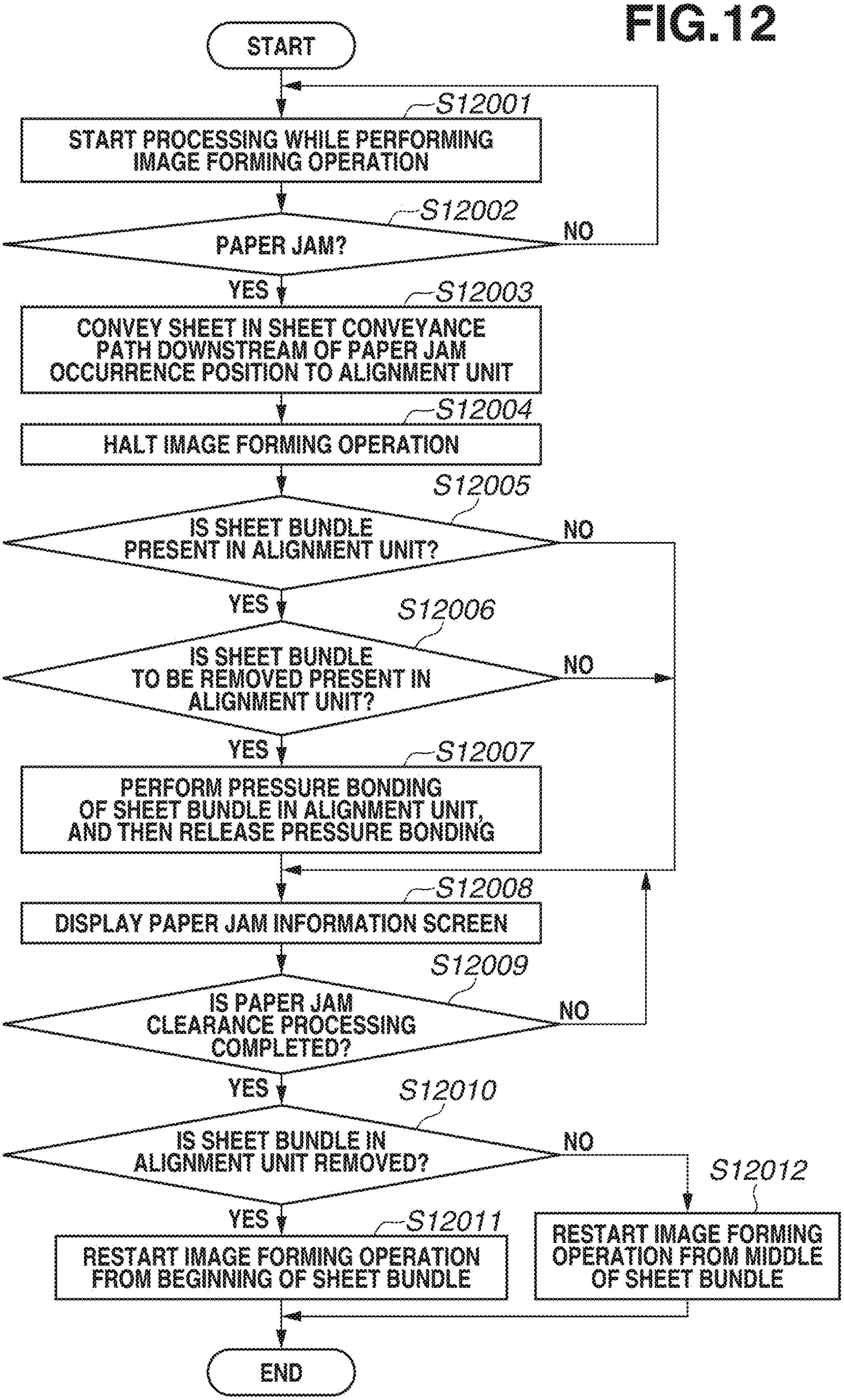
FIG. 12 is a flowchart illustrating processing performed by an image forming apparatus according to the second exemplary embodiment.

FIG. 12 is a flowchart illustrating an operation performed by the CPU 200 of the image forming apparatus 1100 according to the second exemplary embodiment. In FIG. 12, each of steps S12001 to 12012 indicates a step of processing performed by the CPU 200 in the flowchart. The processing performed in steps S12001 to S12012 of the flowchart is implemented by the CPU 200 of the image forming apparatus 1100 reading and executing the program stored in the ROM 201 or the HDD 203.

In step S12001, the CPU 200 of the image forming apparatus 1100 starts the processing in a state of executing the image forming operation described with reference to FIGS. 3A and 3B. The image forming operation is a series of operations of conveying a sheet S from the cassette 1113, forming an image on the sheet S by the image forming unit 1101B, and discharging the image-formed sheet S to the stacking tray 1135, the discharge upper tray 1125, or the discharge lower tray 1137. Further, the image forming operation also includes sheet processing for binding a plurality of sheets S by the sheet processing apparatus 1106.

In step S12002, the CPU 200 of the image forming apparatus 1100 checks whether a certain anomaly has occurred on the conveyance path during the image forming operation, i.e., whether a paper jam has occurred. In a case where the paper jam has occurred (YES in step S12002), the processing proceeds to step S12003. On the other hand, in a case where the paper jam has not occurred (NO in step S12002), the processing returns to step S12001 to continue the image forming operation.

In step S12003, the CPU 200 of the image forming apparatus 1100 specifies the sheet S in a sheet conveyance path located downstream of the paper jam occurrence position, and performs a conveyance control to convey the specified sheet S to the alignment unit 1156. For example, in a case where a paper jam has occurred at the cassette 1113 after several sheets S are fed, the plurality of fed sheets S exists in the conveyance path located downstream of the cassette 1113. Since no paper jam has occurred in the conveyance path located downstream of the cassette 1113, the sheet S can be conveyed to the alignment unit 1156. After the sheet S is conveyed to the alignment unit 1156, the CPU 200 of the image forming apparatus 1100 advances the processing to step S12004.

In step S12004, the CPU 200 of the image forming apparatus 1100 halts the image forming operation, and advances the processing to step S12005.

In step S12005, the CPU 200 of the image forming apparatus 1100 checks whether a sheet bundle is present in the alignment unit 1156 of the sheet processing apparatus 1106. In a case where the sheet bundle is present (YES in step S12005), the processing proceeds to step S12006. Otherwise (NO in step S12005), the processing proceeds to step S12008.

In step S12006, the CPU 200 of the image forming apparatus 1100 checks whether a sheet bundle to be removed is present in the alignment unit 1156 of the sheet processing apparatus 1106.

In a case where the sheet bundle to be removed is present (YES in step S12006), the processing proceeds to step S12007. On the other hand, in a case where the sheet bundle to be removed is not present (NO in step S12006), the processing proceeds to step S12008. In a case where the paper jam has occurred at the cassette 1113 as illustrated in FIG. 11, since the paper jam can be cleared without removing the sheet bundle in the alignment unit 1156 of the sheet processing apparatus 1106, the processing proceeds to step S12008.

In step S12007, the CPU 200 of the image forming apparatus 1100 performs the pressure bonding of the sheet bundle in the alignment unit 1156 of the sheet processing apparatus 1106, and after the bonding of the sheets S is completed, the pressure bonding state is released. Then, the processing proceeds to step S12008.

In step S12008, the CPU 200 of the image forming apparatus 1100 displays the paper jam information screen 901 on the touch panel display 301. Since the sheet bundle is pressure bonded by the thermal pressure bonding unit 1167 in step S12007, and the pressure bonding state is released after the bonding of the sheet bundle is completed, the user can easily remove the sheet bundle from the thermal pressure bonding unit 1167. Further, since the bonding of the sheet bundle is completed as well, it is difficult for the sheet bundle after the release of the pressure bonding state to come apart, and thus the paper jam clearance processing becomes easier.

In step S12009, the CPU 200 of the image forming apparatus 1100 checks whether the paper jam clearance processing has been completed. In a case where the paper jam clearance processing has been completed (YES in step S12009), the processing proceeds to step S12010. On the other hand, in a case where the paper jam clearance processing has not been completed (NO in step S12009), the processing proceeds to step S12008 to display the paper jam information screen 901. Depending on the progress of the paper jam clearance processing, the CPU 200 of the image forming apparatus 1100 updates the display of the filled circle 922 indicating the paper jam occurrence position, and/or the paper jam clearance processing procedure 932 to be performed by the user to clear the paper jam.

In step S12010, the CPU 200 of the image forming apparatus 1100 checks, after the paper jam clearance processing, whether the sheet bundle in the alignment unit 1156 of the sheet processing apparatus 1106 is removed. In a case where the sheet bundle is removed (YES in step S12010), the processing proceeds to step S12011. On the other hand, in a case where the sheet bundle is not removed and remains in the alignment unit 1156 (NO in step S12010), the processing proceeds to step S12012.

In step S12011, since the paper jam is cleared in step S12010, the CPU 200 of the image forming apparatus 1100 restarts the image forming operation. At this time, since the sheet bundle in the alignment unit 1156 is removed, the image forming operation of the image forming apparatus 1100 is restarted from the beginning of the sheet bundle. If the sheets S1 to S10 are to be bonded as a sheet bundle, the image forming by the image forming apparatus 1100 and the pressure bonding processing are restarted from the sheet S1.

In step S12012, since the paper jam is cleared in step S12010, the CPU 200 of the image forming apparatus 1100 restarts the image forming operation. At this time, since the sheet bundle is not removed and remains in the alignment unit 1156, the image forming by the image forming apparatus 1100 and the pressure bonding processing are restarted from the middle of the sheet bundle. If the sheets S1 to S10 are to be bonded as a sheet bundle, and in a case where the paper jam has occurred at the sheet S7, the image forming by the image forming apparatus 1100 and the pressure bonding processing are restarted from the sheet S7 in the middle of the sheet bundle.

As described above, in the second exemplary embodiment, since the pressure bonding state is not released until the bonding of the sheet bundle is completed in step S12007, the sheet bundle after the release of the pressure bonding state does not come apart, and thus the paper jam clearance processing becomes easier.

Further, in step S12006, in a case where the sheet bundle to be removed is not present in the alignment unit 1156 of the sheet processing apparatus 1106 (NO in step S12006), since the paper jam information screen 901 is immediately displayed, the user does not need to wait for the presentation of the paper jam clearance processing procedure.

In the present exemplary embodiment, the tandem type color printer including four process cartridges is exemplified, but types of toners may be five or more types, or three or less types. Further, instead of the configuration in which at least one of the toners is used both as the toner for recording an image on a sheet and the toner for bonding, a configuration may be employed where a toner dedicated for bonding is used. In such a configuration, a process cartridge that uses the toner dedicated for bonding forms only the bonding toner image 39 in FIG. 6.

In addition, in the first exemplary embodiment, the paper jam information screen 901 is displayed immediately after the pressure bonding state is released. However, the present disclosure is not limited thereto, and the CPU 200 may determine whether a predetermined time has elapsed since the release of the pressure bonding state, and may display the paper jam information screen 901 on the operation unit 205 when the CPU 200 determines that the predetermined time has elapsed.

In addition, in the exemplary embodiments described above, the description is given of the example of using the toner as an example of the recording material for the pressure bonding, but a recording material other than the toner, such as ink, may be used as long as the material has adhesivity.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-066906, filed Apr. 17, 2023, which is hereby incorporated by reference herein in its entirety.

What is claimed is:

1. An image forming system comprising:

an image forming apparatus that prints an image on a sheet using a recording material and conveys the sheet, the image forming apparatus applying the recording material at a binding position of the sheet;

a sheet processing apparatus that applies thermal pressure to the binding position of a plurality of sheets on which images are printed by the image forming apparatus which are conveyed by the image forming apparatus to perform a binding process of the plurality of sheets;

wherein the sheet processing apparatus is configured to continue applying the thermal pressure until the binding process has been completed after an occurrence of jam of the sheet is detected while the binding process is being performed, and wherein the sheet processing apparatus starts to release a state that the thermal pressure is applied after the binding process has been completed.

2. The image forming system according to claim 1, further comprising a display that displays a guidance for clearing the jam after the detection of the occurrence of the jam.

3. The image forming system according to claim 2, wherein the display-unit displays the guidance after the state is released.

4. The image forming system according to claim 3, further comprising a controller that determines whether a predetermined time has elapsed, wherein the display displays the guidance based on a determination by the controller that the predetermined time has elapsed since the state is released.

5. The image forming system according to claim 3, wherein, in a case where the plurality of sheets is not present in a sheet processor in the sheet processing apparatus, the display displays the guidance without waiting for the state to be released.

6. The image forming system according to claim 1, further comprising:

a controller that specifies a sheet present in a sheet conveyance path downstream of an occurrence position of the jam; and a conveyance controller that controls the sheet specified by the controller to be conveyed to the sheet processing apparatus.

7. The image forming system according to claim 1, wherein the recording material is a toner.

8. The image forming system according to claim 1, wherein the recording material is an ink.

9. A control method for an image forming system having an image forming apparatus and a sheet processing apparatus, comprising:

printing, by the image forming apparatus, an image on a sheet using a recording material;

conveying, by the image forming apparatus, the sheet, the image forming apparatus applying the recording material at a binding position of the sheet;

applying, by the sheet processing apparatus, thermal pressure to the binding position of a plurality of sheets on which images are printed by the image forming apparatus and which are conveyed by the image forming apparatus to perform a binding process of the plurality of sheets;

continuing, by the sheet processing apparatus, the applying the thermal pressure until the binding process has been completed after an occurrence of a jam of the sheet is detected while the binding process is being performed; and starting, by the sheet processing apparatus, to release a state that the thermal pressure is applied after the binding process has been completed.

10. A non-transitory computer-readable storage medium storing a program for causing computer to execute a control method for an image forming system having an image forming apparatus and a sheet processing apparatus, the control method comprising:

printing, by the image forming apparatus, an image on a sheet using a recording material;

conveying, by the image forming apparatus, the sheet, the image forming apparatus applying the recording material at a binding position of the sheet;

applying, by the sheet processing apparatus, thermal pressure to the binding position of a plurality of sheets on which images are printed by the image forming apparatus and which are conveyed by the image forming apparatus to perform a binding process of the plurality of sheets;

continuing, by the sheet processing apparatus, the applying the thermal pressure until the binding process has been completed after an occurrence of a jam of the sheet is detected while the binding process is being performed; and starting, by the sheet processing apparatus, to release a state that the thermal pressure is applied after the binding process has been completed.

* * * * *